US007848880B2

(12) United States Patent
Cheung

(10) Patent No.: US 7,848,880 B2
(45) Date of Patent: Dec. 7, 2010

(54) TRAFFIC INFORMATION ADAPTIVE TO A USER'S TRAVEL

(75) Inventor: Matthew Cheung, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 11/680,368

(22) Filed: Feb. 28, 2007

(65) Prior Publication Data

US 2008/0208441 A1 Aug. 28, 2008

(51) Int. Cl.
G01C 21/00 (2006.01)
(52) U.S. Cl. .................................................. 701/201
(58) Field of Classification Search ......... 701/200–213; 340/995.13, 995.19, 994
See application file for complete search history.

(56) References Cited

U.S. PATENT DOCUMENTS

| 5,933,100 | A | 8/1999 | Golding |
| 6,150,961 | A | 11/2000 | Alewine |
| 6,240,364 | B1 | 5/2001 | Kerner |
| 6,256,577 | B1 | 7/2001 | Graunke |
| 6,317,686 | B1 | 11/2001 | Ran |
| 6,587,781 | B2 | 7/2003 | Feldman |
| 6,594,576 | B2 | 7/2003 | Fan |
| 6,615,130 | B2 | 9/2003 | Myr |
| 6,882,930 | B2 | 4/2005 | Trayford |
| 7,065,447 | B2 | 6/2006 | Shimizu |

2005/0093720 A1* 5/2005 Yamane et al. ......... 340/995.13

FOREIGN PATENT DOCUMENTS

| KR | 1019990079018 A | 11/1999 |
| KR | 1020040009512 A | 1/2004 |
| KR | 1020050072555 A | 7/2005 |
| WO | 02060157 A2 | 8/2002 |

OTHER PUBLICATIONS

Tomoyoshi Shiraishi et al., "A Development of Traffic Prediction System Based on Real-time Simulation," http://www.transport.iis.u-tokyo.ac.jp/PDFs/2005/2005-028.pdf, 7 pp.
Osamu Masutani, et al., Pheromone Model: Application to Traffic Congestion Prediction,' 2 pp., AAMAS '05, Jul. 25-29, 2005, Utrecht, Netherlands.
Takayuki Nakata et al., "Mining Traffic Data From Probe-Car System for Travel Time Prediction," pp. 817-822, KDD '04, Aug. 22-25, 2004, Seattle, Wash., Industry/Government Track Poster.
Hiroshi Warita et al., Statistical Method For Pre-Trip Traffic Conditions Prediction, pp. 1-8, email: warita@mex.go.jp.

* cited by examiner

*Primary Examiner*—Kim T Nguyen
(74) *Attorney, Agent, or Firm*—Shook, Hardy & Bacon L.L.P.

(57) ABSTRACT

A system, method, and computer-readable medium for providing a traffic information service user with traffic information adaptive to the user's travel are described. The user's origin information, such as departure location and departure time, are identified. Upon identifying the user's origin information, the user's expected arrival times at a plurality of distance segment ends are determined. Traffic information adaptive to the user's travel are output. The traffic information may pertain to travel time, traffic flow, traffic events. The user may receive traffic information via a plurality of communication devices, such as a personal computer, a portable navigation system, a phone, or the like.

20 Claims, 6 Drawing Sheets

| SEGMENT | COMPLETION TIME | FLOW | INCIDENTS |
|---|---|---|---|
| 1 | 8:06 | NORMAL | |
| 2 | 8:13 | SLOW | CONSTRUCTION |
| 3 | 8:20 | NORMAL | |
| 4 | 8:26 | BLOCKED | ACCIDENT |
| 5 | 8:31 | NORMAL | |

*FIG. 5.*

TRAFFIC INFORMATION ADAPTIVE TO A USER'S TRAVEL

BACKGROUND

Traffic information services allow users to make travel decisions based on current travel conditions. For example, traffic information services may display maps with color coded road segments representing the most recently identified traffic condition of each displayed road segment. Traffic information services may also provide a user with estimated travel times based on recent travel conditions as well as provide a user with the latest traffic events, such as traffic incidents, construction, and the like. While such services provide users with the most recently available traffic information, they do not provide predictive traffic information.

Today, as a result of the desire for predictive traffic information, more advanced traffic information services are developing to incorporate traffic predictions. The traffic predictions provide users with traffic information pertaining to a specific future instance. The existing predictive traffic information services, however, simply predict the traffic based on a specific time. For example, a user requesting predictive traffic information for 8:00 a.m. may receive a map displaying the expected traffic conditions at 8:00 a.m. for all road segments.

However, static predictive information, for one snapshot in time, may not be valid for the entire travel route and, accordingly, may prevent users from making an informed travel decision. For instance, a user may utilize a predictive traffic information service, prior to departure, to determine the predicted traffic at time A. As the user begins traveling, at time A, from origin to destination, the predictive information for the beginning of the route may be correct, but the remainder of the route, however, may become invalid due to the user's travel time (e.g., at time B, the user approaches a bottlenecked highway that was displayed as having a normal traffic flow at time A). As a result of the non-adaptive travel information, the user may plan a travel route based on a normal traffic flow predicted for a highway at time A, but at time B when the user approached the highway, the traffic was no longer moving.

In existing predictive traffic information services, for a user to receive predictive traffic information that adapts to a user's travel and is valid for the entire route, the user must estimate the time for arriving at multiple locations along the route and retrieve traffic information pertaining to the identified locations and corresponding estimated arrival times. Such estimation is error prone and may provide the user with inaccurate information. Further, estimating arrival times for multiple locations and retrieving corresponding traffic information may be tedious and time consuming. Consequently, users of traffic information services are not provided with accurate traffic information that is simply obtained.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described below are directed to providing a traffic information service user with traffic information adaptive to the user's travel. The user's origin information, such as departure location and departure time, are identified. Upon identifying the user's origin information, the user's expected arrival times at a plurality of distance segment ends are determined. Traffic information adaptive to the user's travel are output. The traffic information may pertain to travel time, traffic flow, traffic events, and the like. The user may receive traffic information via a plurality of communication devices, such as a personal computer, a portable navigation system, a phone, or the like.

BRIEF DESCRIPTION OF THE SEVERAL VIEWS OF THE DRAWINGS

Embodiments are described in detail below with reference to the attached drawing figures, wherein:

FIG. 5 is a table illustrating an exemplary data store in accordance with an embodiment.

DETAILED DESCRIPTION OF THE INVENTION

Figure 1:
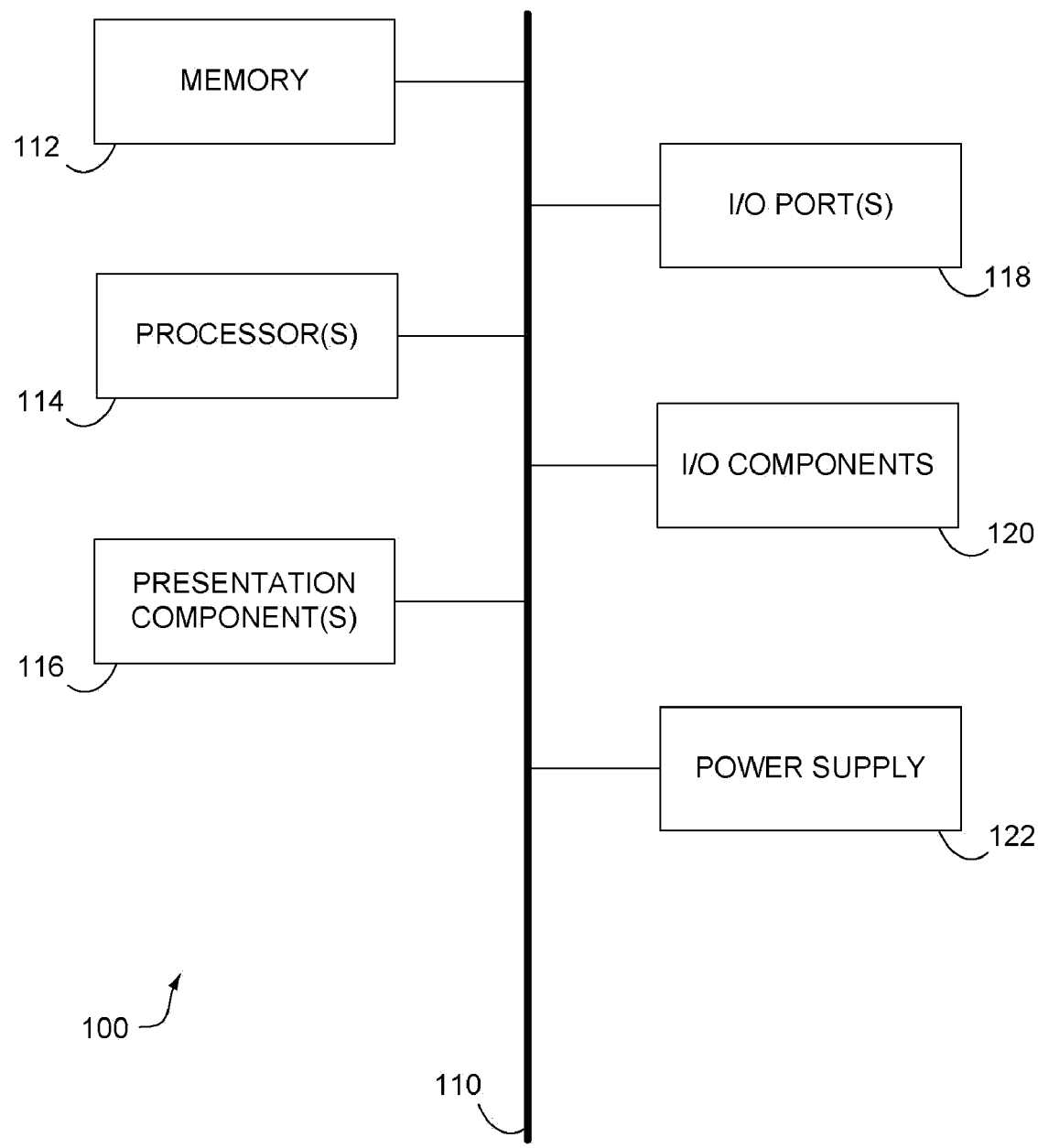
FIG. 1 is a block diagram of a computing-system environment for use in implementing an embodiment.

The subject matter described herein is presented with specificity to meet statutory requirements. However, the description herein is not intended to limit the scope of this patent. Rather, it is contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide techniques for providing traffic information to users. In general, embodiments described herein relate to systems, methods, and computer-readable media for providing users with traffic information that is adaptive to a user's travel time.

Accordingly, in one instance, an embodiment relates to traffic information systems adaptive to calculate an estimated travel completion time for a distance segment and a next distance segment. A traffic information system may include a first identifying component configured to identify a distance segment; a second identifying component configured to identify a start time for beginning the distance segment; a first determining component configured to determine an estimated end time for completing the distance segment, wherein estimating the end time for completing the distance segment comprises utilizing traffic information existing at the start time for beginning the distance segment; a third identifying component configured to identify a next distance segment, the next distance segment beginning at the end of the distance segment and having a start time for beginning the next distance segment equal to the estimated end time for completing the distance segment; and a second determining component configured to determine an estimated end time for completing the next distance segment, wherein estimating the end time for completing the next distance segment comprises utilizing traffic information existing at the start time for beginning the next distance segment.

In another instance, an embodiment relates to method for calculating the estimated time of travel completion for first and second distance segments. A method may include identifying a first distance segment; identifying a departure time for beginning the first distance segment; determining an estimated ending time for completing the first distance segment, wherein estimating the ending time for completing the first distance segment comprises utilizing traffic information existing at the departure time for beginning the first distance segment pertaining to the first distance segment; identifying a second distance segment, the second distance segment starting at the end of the first distance segment and having a departure time for beginning the second distance segment equal to the estimated ending time for completing the first distance segment; and determining an estimated ending time for completing the second distance segment, wherein estimating the ending time for completing the second distance segment comprises utilizing traffic information existing at the departure time for beginning the second distance segment pertaining to the second distance segment.

In yet another embodiment, the embodiments are directed to one or more computer-readable media having computer-executable instructions embodied thereon. One or more computer-readable media may include identifying a distance segment; identifying a departure time for beginning the distance segment; determining an estimated ending time for completing the distance segment, wherein estimating the ending time for completing the distance segment comprises accessing a database having traffic information pertaining to the departure time for beginning the distance segment and pertaining to the distance segment traffic; identifying a next distance segment, the next distance segment starting at the end of the distance segment and having a departure time for beginning the next distance segment equal to the estimated ending time for completing the distance segment; and determining an estimated ending time for completing the next distance segment, wherein estimating the ending time for completing the next distance segment comprises accessing a database having traffic information existing at the departure time for beginning the next distance segment and pertaining to the next distance segment traffic.

Having briefly described an overview of embodiments, an exemplary operating environment suitable for use in implementing embodiments is described below.

Referring initially to FIG. 1, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, digital phone, personal digital assistant ("PDA"), portable navigation system, or other device capable of executing computer instructions.

Embodiments may be described in the general context of computer code or machine-useable instructions, including computer-executable instructions such as program modules, being executed by a computer or other machine, such as a personal data assistant, portable navigation system, or other handheld device. Generally, program modules including routines, programs, objects, components, data structures, and the like, refer to code that perform particular tasks or implement particular abstract data types. Embodiments may be practiced in a variety of system configurations, including hand-held devices, consumer electronics, general-purpose computers, more specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
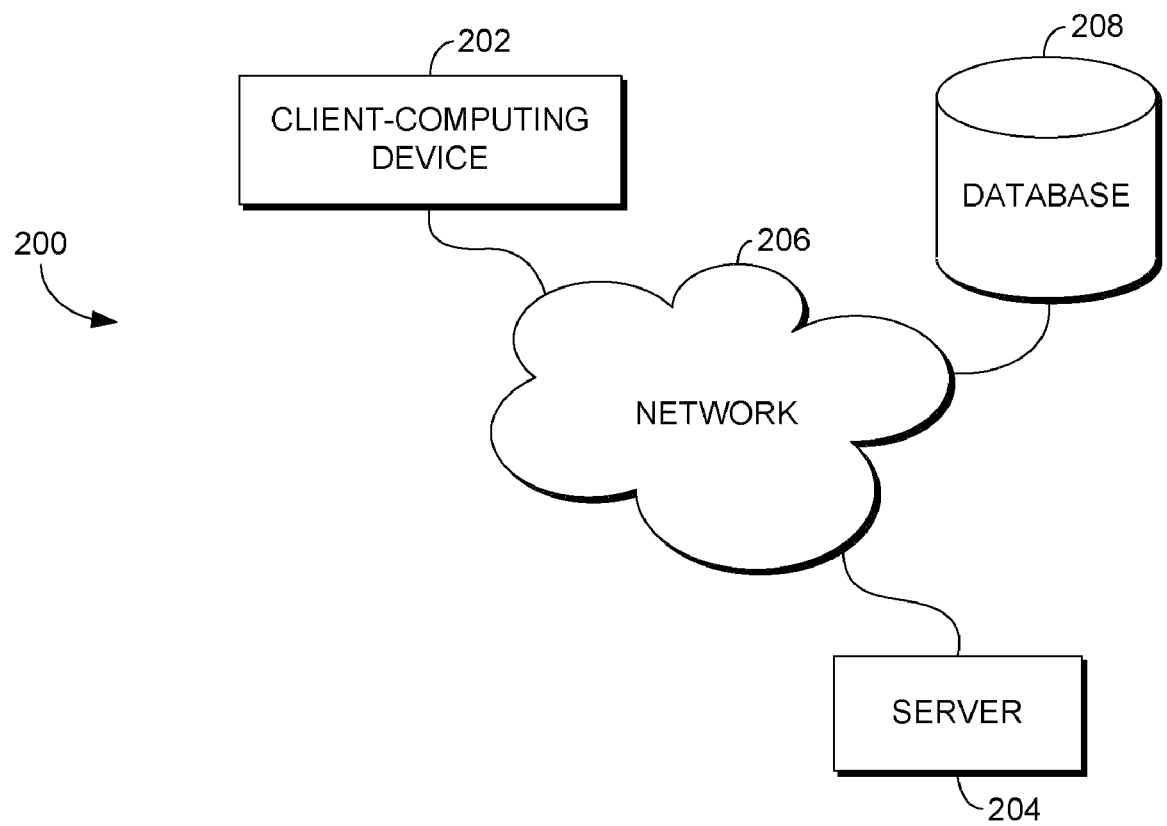
FIG. 2 is a block diagram of a networking environment for use in implementing an embodiment.

FIG. 2 illustrates a block diagram of a networking architecture for use in implementing an embodiment. The networking architecture, generally referenced by numeral 200, comprises client-computing devices 202, server 204, and a database 208 which communicate via a network 206. It will be appreciated by one of ordinary skill in the art that networking architecture 200 is merely an example of one suitable networking environment and is not intended to suggest any limitation as to the scope of use or functionality of embodiments. Neither should networking architecture 200 be interpreted as having any dependency or requirement related to any single component or combination of components illustrated therein.

Client-computing device 202 may be any type of computing device, such as device 100 described above with reference to FIG. 1. By way of example only and not limitation, client-computing device 202 may be a personal computer, desktop computer, laptop computer, handheld device, cellular phone, digital phone, PDA, portable navigation system, or the like. It should be noted that embodiments are not limited to implementations on such computing devices, but may be implemented on any of a variety of different types of computing devices.

Network 206 may include any computer network or combination thereof. Examples of computer networks configurable to operate as network 206 include, without limitation, a wireless network, landline, cable line, fiber-optic line, LAN, WAN, or the like. Network 206 is not limited, however, to connections coupling separate computer units. Rather, network 206 may also comprise subsystems that transfer data between servers or computing devices. For example, network 206 may also include a point-to-point connection, tan internal system Ethernet, a backplane bus, an electrical bus, a neural network, or other internal system. In an embodiment where network 206 comprises a LAN networking environment, components are connected to the LAN through a network interface or adapter. In an embodiment where network 206 comprises a WAN networking environment, components use a modem, or other means for establishing communications over the WAN, to communicate. In embodiments where network 206 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

The server 204 may include any type of application server, database server, or file server configurable to perform the methods described herein. In addition, the server 204 may be a dedicated or shared server. One example, without limitation, of a server that is configurable to operate as the server 204 is a structured query language ("SQL") server executing server software such as SQL Server 2005, which was developed by the Microsoft® Corporation headquartered in Redmond, Wash.

Components of server 204 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via network 206. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that networking architecture 200 is merely exemplary. While the server 204 is illustrated as a single box, one skilled in the art will appreciate that the server 204 is scalable. For example, the server 204 may in actuality include 100 servers in communication. Moreover, the database 208 may be included within the server 204 or client-computing device 202 or as a computer-storage medium. The single unit depictions are meant for clarity, not to limit the scope embodiments in any form.

In operation, a user interacts with the client-computing device 202 via a graphical user interface. In one embodiment, the graphical user interface utilizes a web browser to access a map service executing on server 204. Exemplary map services include Microsoft Windows Live™ Maps and Traffic.com®. In alternative embodiments, the graphical user interface accesses the map service via an application executing on the client-computing device 202. For example, the map service may be incorporated into an application such as Microsoft® Streets and Trips 2007.

In an embodiment, the map service is a web service configured to support interoperable machine-to-machine communication between the client-computing device 202 and the server 204. In an alternative embodiment, the map service includes an application programming interface ("API") configurable to access the database 208. Examples of such APIs include, without limitation, active data objects ("ADO"), remote data objects ("RDO"), and the like.

Figure 3:
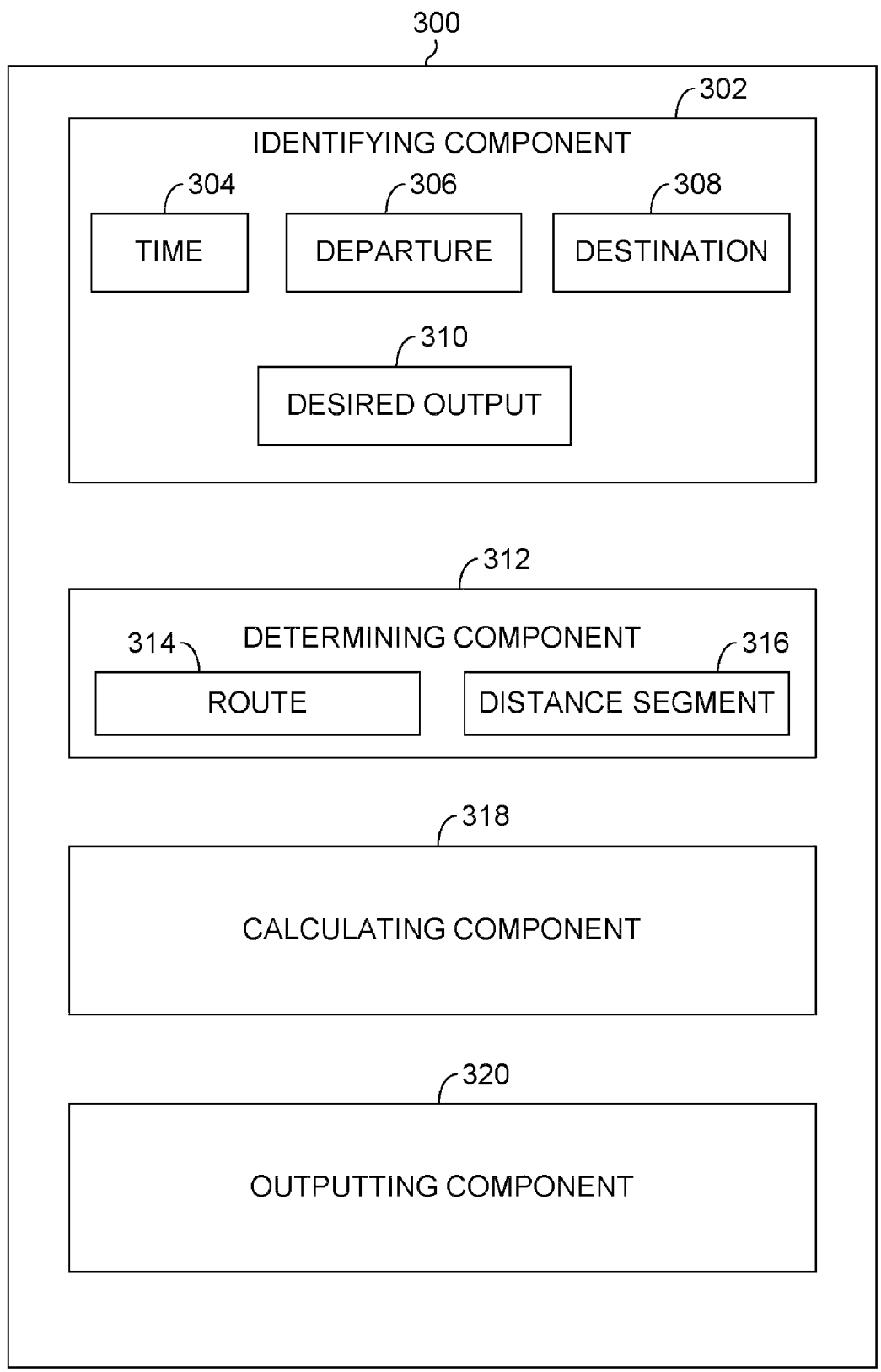
FIG. 3 illustrates an exemplary system for adapting traffic information in accordance with a user's travel, according to an embodiment.

FIG. 3 illustrates an exemplary system for providing predictive traffic information adaptive to one or more users. A user may be an individual commuter or multiple commuters aggregated near an identified time and location. For example, a user may be multiple commuters driving by exit 22 around 8:15 a.m. on Jan. 28, 2007.

As shown in FIG. 3, an exemplary computer system 300 includes an identifying component 302, a determining component 312, a calculating component 318, and an outputting component 320. Computer system 300 may reside on a server 204, a client-computing device 202, or a combination thereof.

Identifying component 302 is a component that identifies origin information, including a user's expected departure time and a user's expected departure location, and destination information, if applicable and desired. In one embodiment, identifying component 302 comprises time component 304, departure component 306, destination component 308, and desired output component 310. While time component 304, departure component 306, destination component 308, and desired output component 310 are illustrated as four separate components in FIG. 3, one skilled in the art will appreciate that the components are scalable and may, in actuality, be combined into a single component or a plurality of components.

Time component 304 identifies a user's expected departure time. A user's expected departure time may be identified based on a user's input, a default measure, a user's access history, or other departure time identification mechanism, such as, for example, a device configured to identify a vehicle's ignition start time. An expected departure time based on a user's input may include a time selected by a user or input via a keyboard or voice. An expected departure time based on a default measure may include the present time, the time the user accesses the traffic information system, or a specific time following the user's request for traffic information or initial system access (e.g., five minutes after logging in to the traffic information system). The specific time following the user's request for traffic information or initial system access may be based on user input, a system provider's input, or an algorithm. An expected departure time based on a user's access history may be determined by the most recent system accesses or an algorithm configured to include user details such as, for example, user's login time, user's logoff time, user's current location and user's destination.

Departure component 306 identifies a user's expected departure location. A user's expected departure location may be identified based on a user's input, a default measure, a user's access history, network infrastructure, such as an IP address, or other departure time identification mechanism, such as, for example, a device configured to identify a user's or vehicle's location (e.g., portable navigation system). Similar to time component 304, an expected departure location based on a user's input may include a location selected by a user (such as using a drop down menu or selecting a location on a map) or input via a keyboard or voice pertaining to an address, coordinate, intersection, or the like. An expected departure location based on a default measure may include a default to the location of the device utilizing the traffic information system, such as a home location, an office location, a vehicle location, or a user's location. An expected departure location based on a user's access history may be determined by the most recent system access locations or an algorithm configured to include user details such as, for example, user's current location and user's destination.

Destination component 308 identifies a user's expected destination location. For example, the expected destination location is the final location where the user desires to end travel. A user's expected destination location may be identified based on a user's input, a default measure, or a user's access history. An expected destination location based on a user's input may include a destination location selected by a user (such as using a drop down menu or selecting a location on a map) or input via a keyboard or voice pertaining to an address, coordinates, intersection, or the like. An expected destination location based on a default measure may include a default to the location of the user's work address, home address, or other frequented location. An expected destination location based on a user's access history may be determined by the most recently identified destinations or an algorithm.

Desired output component 310 identifies one or more desired outputs. Desired outputs may include output pertaining to traffic flow, a traffic event, a travel time, or a combination thereof. Output pertaining to traffic flow refers to how fast traffic is moving and may be based, at least in part, on speed limits, commuters' rates of speed, weather, traffic events, historical data, etc. Output pertaining to traffic events may be based on traffic incidents, construction, community activities, historical events, etc. Information pertaining to a user's travel time may also be output. Travel time is the predicted amount of time a user takes to travel from one distance segment to another distance segment, the predicted amount of time a user takes to travel multiple distance segments, or the predicted amount of time a user takes to travel an entire route. Desired output pertaining to traffic flow, a traffic event, or a travel time may further pertain to one or more distance segments, one or more roads, a metropolitan area, a state, or the like. A distance segment may be a predefined distance, such as a road distance or radial distance, a predefined road, a predefined road segment, or the like. In one embodiment, all information pertaining to traffic flow, traffic events, and travel time may be desirable.

The desired output may be selected or input by the user or may be a default based on the user's desires. Alternatively, the desired output may be selected or input by the service provider or may be a default based on the service provider. In some embodiments, desired output component 310 is not necessary.

Determining component 312 is a component that determines one or more routes and determines relevant distance segments. In one embodiment, determining component 312 comprises route component 314 and distance segment component 316. While route component 314 and distance segment component 316 are illustrated as two separate components in FIG. 3, one skilled in the art will appreciate that the components are scalable and may, in actuality, be combined into a single component or a plurality of components.

Route component 314 determines one or more routes. A route includes one or more distance segments. A distance segment may be a predefined distance, such as a road distance or radial distance, a predefined road, a predefined road segment, or the like. In some instances, one or more routes may be determined based on an identified departure location and an identified destination location or based on an identified departure location and an identified desired output pertaining to one or more specific distance segments or one or more specific roads. Multiple routes, such as shortest distance route, shortest time route, user preferred route, and the like, may exist for each specific destination location, distance segment, or road. Alternatively, a user or service provider set default may exist such that a defined number of routes, such as one, exist for each specific destination location, distance segment, or road.

In other instances, one or more routes may be determined based on an identified departure location and an identified desired output pertaining to a metropolitan area, or the like. In such a case, a destination location need not be identified and traffic information pertaining to all major roads, or even all distance segments, may be displayed. Although traffic information is desired pertaining to a vicinity, the system determines a plurality of routes to provide a user with traffic information adaptive to the user's travel.

In one embodiment, routes may be determined based on shortest distance to each distance segment or shortest time to each distance segment. For example, with reference to FIG. 6, assume a user's origin location is point O. To determine routes for providing traffic information pertinent to the metropolitan area, the system may assume that the user will travel distance segment A to arrive at the end of distance segment A. At the end of distance segment A, the system will further assume that the user will travel distance segment B to arrive at the end of distance segment B, rather than travel distance segments D, E, and F to arrive at the same point. At the end of distance segment B, the system will assume that the user will travel distance segment C to arrive at the end of distance segment C, rather than travel distance segments B, D, E, F, and C to arrive at the same point. Similarly, at the end of distance segment B, the system will also assume that the user will travel distance segment F to arrive at the end of distance segment F, rather than travel distance segments B, D, and E to arrive at the same point. Accordingly, the system determines that one route includes distance segments A, B, and C and another route includes distance segments A, B, and F.

Distance segment component 316 determines relevant distance segments for a route. Determining relevant distance segments may increase the traffic information system's efficiency by reducing the number of distance segments analyzed. Relevant distance segments may be determined based on the desired output identified by desired output component 310, the destination location identified by destination location 308, or a combination thereof.

In embodiments where expected traffic flow information is a desired output, relevant distance segments may include distance segments of which a user desires traffic information or distance segments having a changed traffic flow caused by, for example, reduced driving speeds, traffic events, weather, etc. In such cases, relevant distance segments may also include at least one distance segment on a predetermined route that may be traveled to arrive at the specified or changed distance segment. Alternatively, relevant distance segments may include all distance segments within a vicinity in cases where traffic flow information pertaining to an entire area is desired.

In embodiments where traffic event information is a desired output, relevant distance segments may include distance segments effected by known and expected traffic events, such as, for example, traffic incidents, construction, community activities, and the like. In such cases, relevant distance segments may also include at least one distance segment on a predetermined route that may be traveled to arrive at the distance segment effected by known or expected traffic events. Alternatively, relevant distance segments may include all distance segments within a vicinity in cases where traffic event information pertaining to an entire area is desired.

In embodiments where travel time is a desired output, relevant distance segments may include any distance segment on a select number of routes on which the user may travel to arrive at a destination or any distance segment on a specific route, such as a shortest distance route, shortest time route, on which the user may travel to arrive at a destination. Alternatively, relevant distance segments may include all distance segments within a vicinity in cases where travel time for all distance segments within an area is desired.

Calculating component 318 calculates expected arrival times for a plurality of relevant distance segment ends. An area, such as roads, may be divided into segments (i.e., distance segments) to provide more accurate traffic information output. As previously mentioned, a distance segment may be a predefined distance, such as a road distance or radial distance, a road, a road segment, or a combination thereof. A distance segment end is a location a user arrives at when reaching the end of a distance segment.

Multiple methods may be utilized to calculate a user's expected time of arrival at each distance segment end. In one embodiment, a geographic reference system may be used to calculate expected arrival times at distance segment ends. One skilled in the art will recognize that this method incorporates a radial distance from the departure location, or other location, to the road segment end and an assumed nominal travel rate. In another embodiment, a routing engine may be used to compute the earliest time a user is expected to arrive at a distance segment end based on user's route. In either a geographic reference system embodiment or a routing engine embodiment, a user's expected time of arrival at each distance segment end may be determined, at least in part, by retrieving information from a database having expected travel times.

In a more advanced and more accurate embodiment, traffic conditions, such as traffic flow and traffic events, may be utilized to calculate a user's expected time of arrival at distance segment ends. In such a case, upon identifying expected origin information, to calculate an expected arrival time for a distance segment end, the expected arrival time for the previous distance segment end as well as the expected travel time on the distance segment of interest is determined. Accordingly, calculating expected arrival times for distance segment ends begins with the distance segment nearest the departure location and depends on distance segment travel conditions at expected travel times. By way of illustration, refer to FIG. 5 and assume segment 1 is the distance segment closest to the departure location, e.g., home, and user departed from home at 8:00. The user is expected to proceed on distance segment 1 for six minutes and arrive at the end of distance segment 1 at 8:06. Because the user is expected to arrive at the end of distance segment 1 at 8:06, the user is also expected to begin distance segment 2 at 8:06. The user is expected to have a distance segment 2 travel time of seven minutes and, thus, arrive at the end of distance segment 2 at 8:13. The procedure continues until the user arrives at the destination, located at the end of distance segment 5, at 8:31.

With respect to the advanced embodiment, numerous factors may be included in determining the user's expected travel time on a specific distance segment at a specific time, such as, for example, traffic flow, traffic events, and historical traffic information. Traffic flow may include the rate of speed commuters are driving on road segments and may incorporate the speed limit, road type, weather conditions, special zones (e.g., school zones), and traffic events. Traffic events include, among other things, traffic incidents, road construction, community events such as sporting events, etc. In one embodiment, the user's expected travel time on a specific distance segment at a specific time may be determined by retrieving traffic condition information from a database having expected traffic conditions.

A user may request traffic condition or travel time information related to routes to a specified destination or routes to a specified distance segment or road. In such a case, the destination may be identified at destination component 308 and the computer system may utilize one of the three methods mentioned above (i.e., geographical reference system, routing engine, or expected traffic conditions) to calculate the user's expected time of arrival at each distance segment end on each route. Traffic information, such as traffic flow and traffic events may be output pertaining to each distance segment based on the expected arrival time for the preceding distance segment end. Additionally, the arrival times for each distance segment end may be summed to attain an expected travel time that is adaptive to the user's travel. One or more travel times may be calculated depending on the number of routes.

Alternatively, a user may request traffic information pertaining to a metropolitan area, or other vicinity. In such a case, a destination location need not be identified and traffic information pertaining to all highways, or even all distance segments, may be displayed. To calculate arrival times at segment route ends, the system relies on the multiple routes determined at route component 314. The computer system may utilize one of the three methods mentioned above (i.e., geographical reference system, routing engine, or expected traffic conditions) to calculate the user's expected time of arrival at each distance segment end on the predetermined routes. For example, with reference to FIG. 6, assume the user's origin location is point O and information pertaining to a metropolitan area is the desired output. The system will calculate the expected time of arrival at the end of distance segment A. Based on the expected time of arrival at the end of distance segment A, traffic information for distance segments B and D will be output pursuant to that time. Based on the expected time of arrival at the end of distance segment B, traffic information for distance segments C and F will be output pursuant to the calculated time. For instance, based on the expected arrival time at the end of distance segment B, the traffic flow for distance segment C is displayed as 25-45 miles per hour for the first portion of the segment and changes to 0-25 miles per hour for the end portion of distance segment C.

In addition to displaying traffic flow and traffic event information for a metropolitan area, travel times, based on the calculated expected time of arrivals at each distance segment end, may also be displayed even though no destination is specified. In one instance, a map may display a symbol at distance segment ends and a user may select the symbol such that the travel time from the user's departure location to the distance segment end will be displayed.

Outputting component 320 outputs traffic information pertaining to traffic flow, traffic events, travel time, or a combination thereof. An outputting component 320 residing on a server outputs traffic information to a client-computing device, such as client-computing device 100. An outputting component 320 residing on a client-computer outputs traffic information to the user via a graphical user interface (GUI). Outputting component 316 may determine the traffic information to output pursuant to the desired output identified by desired output component 310.

The traffic information output by outputting component 316 may result in modifying, displaying, or removing particular traffic information. For example, with respect to traffic events, the severity of a traffic incident may be adjusted based on predicted progress of the incident (e.g., an incident that is being cleared may be completely cleared by the time the user arrives and, hence, should be downgraded or removed). On the other hand, a new incident may be displayed if it becomes relevant by the time the user is expected to arrive (e.g., scheduled road maintenance).

Figure 6:
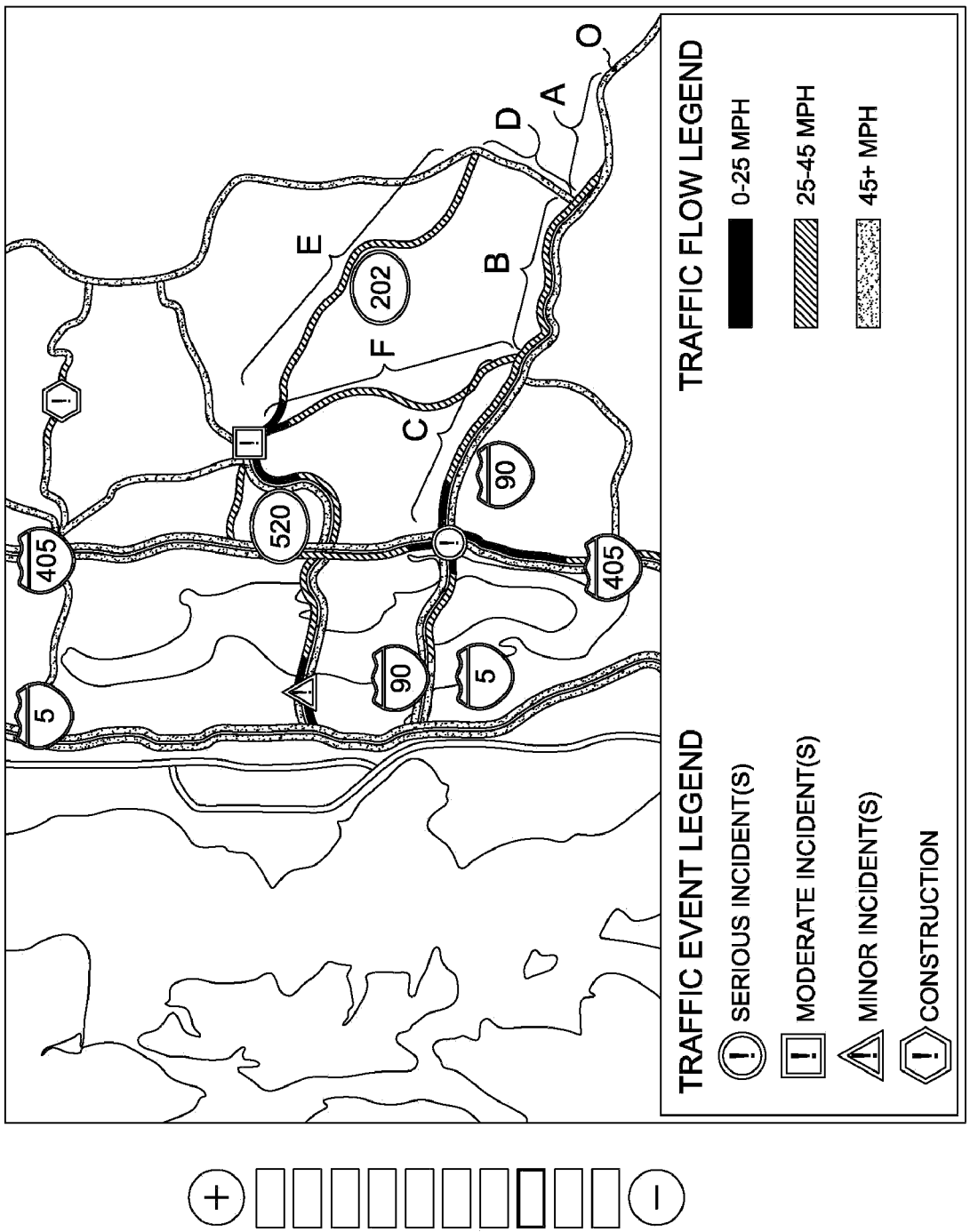
FIG. 6 is an exemplary display of traffic information according to an embodiment.

Traffic information pertaining to traffic flow may be output. Traffic flow may be based, at least in part, on speed limits, commuters' rates of speed, weather, traffic events, and historical data. Traffic flow may be graphically represented in a variety of methods. For example, traffic flow may be graphically depicted on a map by simply utilizing different road segment colors to indicate different traffic flows. Various road segment colors may be used, for example, to indicate assorted rates of speed or reductions in rate of speeds (e.g., red road segments indicate nonmoving traffic or traffic moving at a speed of zero to twenty-five miles per hour, yellow road segments indicate traffic moving at reduced speeds or traffic moving at a speed of twenty-five to forty-five miles per hour, green road segments indicate free flowing traffic or traffic moving at a speed of more than forty-five miles per hour). Alternatively, traffic flow may be graphically depicted on a map by using different display formats, such as solid, broken, or dashed lines. FIG. 6 provides a display of traffic flow graphically depicted. Traffic flow may also be described by value, text, or symbol representations. For example, a value of 10 (on a scale of 1 to 10), the word "outstanding," or four stars may represent the traffic is free flowing or traveling at a speed of more than forty-five miles per hour. One skilled in the art will appreciate that a variety of different graphical, numerical, textual, or symbolical representations may be used to differentiate various traffic flow conditions. Whether traffic flow is depicted graphically, quantitatively, textually, or symbolically, the traffic flow may pertain to one or more specific distance segments, specific roads, specific routes, roads in a metropolitan area, and roads in a state.

In another embodiment, traffic events may be output. Traffic events may include traffic incidents, construction, community activities, and historical events. Traffic events may also be output via a graphical depiction, such as an icon positioned on a map display near the traffic event. FIG. 6 provides a display of traffic events graphically depicted. Traffic events may also be described by numerical and textual representations. For example, a value of 5 (on a scale of 1 to 10) or the word "construction" may represent that construction on a road segment is delaying traffic. Furthermore, details pertaining to the traffic event may also be output, such as, for example, severity level, location, description, start time, and estimated end time. One skilled in the art will appreciate that a variety of different graphical, numerical, and textual representations may be used to differentiate various traffic events. Whether traffic events are depicted graphically, quantitatively, or textually, the traffic details output may pertain to one or more specific distance segments, specific roads, specific routes, roads in a metropolitan area, roads in a state, or the like.

In yet another embodiment, a user's calculated travel time may be output. Travel time is the predicted amount of time a user takes to travel from one distance segment to another distance segment, the predicted amount of time a user takes to travel multiple distance segments, or the predicted amount of time a user takes to travel an entire route. Travel time may also be output via a graphical depiction, a value, text, and the like. For example, the value 5, the words "five minutes," or two stars may represent a travel time of approximately five minutes or a relatively short travel time. One skilled in the art will appreciate that a variety of different graphical, numerical, or textual representations may be used to differentiate various travel times.

In one instance, a destination may be identified by destination component 308 to output a user's travel time. The arrival times for each road segment end may be summed to attain an expected travel time that is adaptive to the user's travel. One or more arrival times may be calculated depending on the number of routes. In an alternative embodiment, a destination need not be identified by destination component 308. In such a case, because no destination is identified, calculating arrival times to road segment ends may be performed in a manner similar to that which may be used to calculate arrival times at road segment ends for outputting traffic flow information where no destination exists. In one instance, a map may display a symbol at road segment ends or selected road segment ends and a user may select the symbol such that the travel time from the user's departure location to the road segment end will be displayed.

Figure 4:
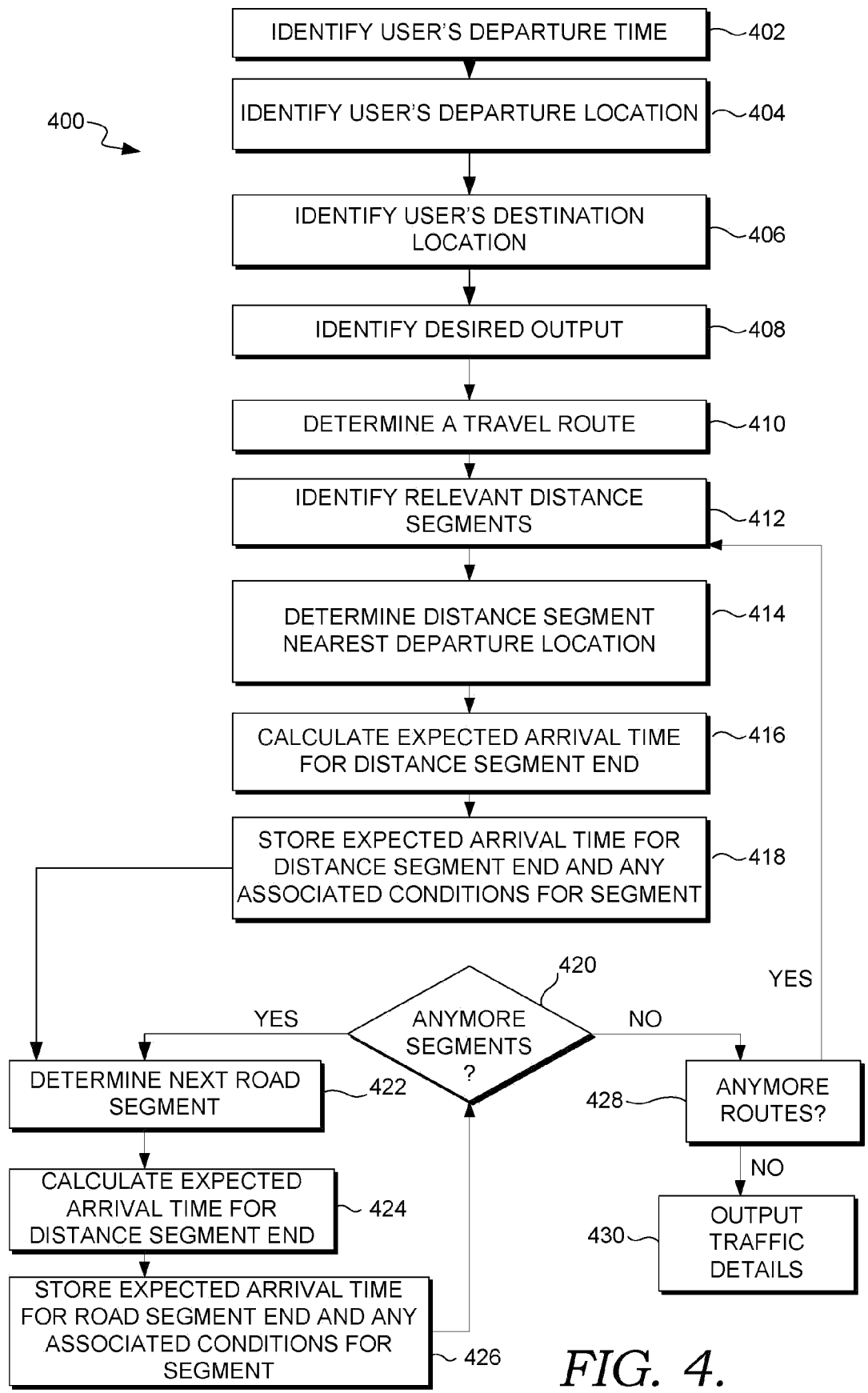
FIG. 4 is a flow diagram illustrating an exemplary method for providing traffic information to a user of traffic information services, according to an embodiment.

FIG. 4 illustrates an exemplary method 400 for providing traffic information adaptive to a user's travel time. Initially, at block 402, a user's departure time is identified. A user's expected departure time may be identified based on a user's input, a default measure, a user's access history, or other departure time identification mechanism. At block 404, a user's departure location is identified. A user's expected departure location may be identified based on a user's input, a default measure, a user's access history, or other departure time mechanism. A destination location is identified at block 406. One skilled in the art will recognize that in some embodiments a destination location need not be identified.

At block 408, the desired output is identified. Desired outputs may include outputs pertaining to traffic flow, a traffic event, a travel time, or a combination thereof. Desired output may be input or selected by the user or the service provider. At block 410, a route is determined. In embodiments where a destination location is identified or where a travel time, traffic flow, or traffic event pertaining to a one or more specific distance segments or roads are the desired output, the route may be based on the shortest distance, shortest time, preferred route designated by the user, or the like, to get to the predetermined end point. In embodiments where destination locations are not identified and the desired output pertains to a metropolitan area, for example, routes may be determined by algorithms. The algorithms may be configured to include shortest distance or shortest time calculations.

The relevant distance segments are determined at block 412. Relevant distance segments may be determined based on the desired output identified by desired output component 310, the destination location identified by destination location 308, or a combination thereof. Relevant distance segments may include one or more distance segments or roads that are of interest to the user, distance segments positioned on a route to one or more distance segments or roads that are of interest to the user, road segments on a route where a destination location is identified, or all distance segments in a vicinity.

At block 414, the relevant distance segment nearest the departure location is determined. The expected arrival time for the distance segment end identified at block 414 is calculated at block 416. At block 418, the expected arrival time for the distance segment end and any associated traffic flow or traffic events are stored. For example, with reference to FIG. 5, distance segment 1 is the nearest distance segment to the departure location and has an expected completion time of 8:06, the traffic flow is normal and there are no incidents for the segment.

The next distance segment of the route is determined at block 422, and the expected arrival time for the respective distance segment end utilizing the completion time for the previous distance segment end is calculated at block 424. At block 426, the expected arrival time for the distance segment end and any associated traffic flow or traffic events are stored.

At block 420, it is determined whether anymore distance segments in the route exist. If there are more distance segments, blocks 422 through 426 are revisited until no more distance segments exist in the predetermined route. When it is determined that no additional distance segments exist in the predetermined route, at block 428, it is determined whether other routes having relevant road segments exist. If so, blocks 412 through 428 are revisited until no other routes having relevant road segments exist. When no other routes having relevant road segments exist at block 428, the desired output traffic information is output at block 430. In one embodiment, at block 430, the traffic information is provided to the user.

By way of illustration, with reference to FIG. 4 and FIG. 5, user begins at departure location O at 8:00 a.m. and inputs a destination location of the end of distance segment 5. At block 408, the user selects the desired output to include traffic events, traffic flow, and travel time pertaining to a shortest distance route from departure location O to destination location of the end of distance segment 5. At block 410, the route 1, 2, 3, 4, 5 is determined and relevant distance segments 1, 2, 3, 4, and 5 are determined at block 412. At block 414, it is determined that the distance segment located closest to the departure location is segment 1. The traffic flow for segment 1 is determined to have a normal traffic flow and segment 1 has no traffic events. The calculated estimated arrival time for distance segment end 1 is 8:06 a.m., based on the expected traffic conditions of segment 1. The traffic information, including arrival time, traffic flow, and traffic events are stored at block 418. At block 422 the next distance segment 2 is identified. At block 424, utilizing traffic information for segment 2 at 8:06, the completion time of segment 1, it is determined that the expected arrival time for distance segment end 2 is 8:13 a.m. because of a slow traffic flow due to construction. The traffic information is stored at block 426. At block 420, it is again determined that there are more distance segments in the route 1, 2, 3, 4, 5, and at block 422 the next distance segment 3 is identified. At block 424, utilizing traffic information for distance segment 3 at 8:13, it is determined that the expected arrival time for distance segment end 3 is 8:20 and that there are no traffic events and the traffic flow is normal for distance segment 3 at arrival time 8:20. The traffic information is stored at block 426. At block 420, it is again determined that there are more distance segments in the route 1, 2, 3, 4, 5 and at block 422 the next distance segment 4 is identified. At block 424, utilizing traffic information for segment 4 at 8:20, it is determined that the expected arrival time for distance segment end 4 is 8:26 a.m. and that the traffic flow of segment 4 is blocked at arrival time 8:26 due to a traffic incident. The traffic information is stored at block 426. At block 420, it is again determined that there are more distance segments in the route 1, 2, 3, 4, 5 and at block 422 the next distance segment 5 is identified. At block 424, utilizing traffic information for segment 5 at 8:26, it is determined that the expected arrival time for distance segment end 5 is 8:31 and that the traffic flow of distance segment 5 is normal and there are no traffic events at arrival time 8:31. The traffic information is stored at block 426.

At block 420, it is determined that there are no further relevant distance segments in the route determined at block 412. At block 428, it is further determined that there are no further routes available to travel from departure location O to destination location at the end of segment 5. The desired traffic information pertaining to traffic flow, traffic events, and travel time are output at block 430.

The embodiments have been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computerized traffic information system adaptive to calculate an estimated travel completion time for at least a distance segment and a next distance segment, the system comprising:

a processing unit; and a memory for storing computer-executable instructions that when executed by the processing unit executes:

a first identifying component configured to identify a distance segment;

a second identifying component configured to identify a start time for beginning the distance segment;

a first determining component configured to determine an estimated end time for completing the distance segment, wherein estimating the end time for completing the distance segment comprises utilizing traffic information existing at the start time for beginning the distance segment, the traffic information existing at the start time for beginning the distance segment comprising a first rate of speed a first set of one or more commuters are expected to travel on the distance segment at the start time for beginning the distance segment in accordance with weather conditions and traffic incidents at the start time for beginning the distance segment;

a third identifying component configured to identify a next distance segment, the next distance segment beginning at the end of the distance segment and having a start time for beginning the next distance segment equal to the estimated end time for completing the distance segment; and a second determining component configured to determine an estimated end time for completing the next distance segment, wherein estimating the end time for completing the next distance segment comprises utilizing traffic information existing at the start time for beginning the next distance segment, the traffic information existing at the start time for beginning the next distance segment comprising a second rate of speed a second set of one or more commuters are expected to travel on the distance segment at the start time for beginning the distance segment in accordance with weather conditions and traffic incidents at the start time for beginning the next distance segment.

2. The traffic information system of claim 1 further comprising accessing a database of traffic information to retrieve traffic information existing at the start time for beginning the distance segment.

3. The traffic information system of claim 1, wherein the traffic information comprises traffic flow, traffic events, travel times, travel distances, or a combination thereof.

4. The traffic information system of claim 1, wherein the distance segment and the next distance segment comprise a predetermined distance, a predetermined road, a predetermined road segment, or a combination thereof.

5. The traffic information system of claim 4, wherein the predetermined distance comprises a predetermined road distance or a predetermined radial distance.

6. The traffic information system of claim 1, wherein the traffic information is based on a geographic reference system, at least one expected traffic condition, a routing engine, or a combination thereof.

7. The traffic information system of claim 1, further comprising a fourth identifying component configured to identify a departure location for beginning the distance segment.

8. The traffic information system of claim 1, wherein the departure time for beginning the distance segment is input or selected by a traffic information service user or a traffic information service provider.

9. The traffic information system of claim 1, wherein estimated time of travel completion is calculated for all distance segments on a route.

10. The traffic information system of claim 1, further comprising an outputting component configured to output traffic information to a traffic information service user.

11. One or more computer-readable storage medium having computer-executable instructions for calculating the estimated time of travel completion for first and second distance segments, the method comprising:
    identifying a first distance segment;
    identifying a departure time for beginning the first distance segment;
    determining an estimated ending time for completing the first distance segment, wherein estimating the ending time for completing the first distance segment comprises utilizing traffic information existing at the departure time for beginning the first distance segment pertaining to the first distance segment;
    identifying a second distance segment, the second distance segment starting at the end of the first distance segment and having a departure time for beginning the second distance segment equal to the estimated ending time for completing the first distance segment; and
    determining an estimated ending time for completing the second distance segment, wherein estimating the ending time for completing the second distance segment comprises utilizing traffic information existing at the departure time for beginning the second distance segment pertaining to the second distance segment, the traffic information existing at the departure time for beginning the second distance segment comprising a rate of speed a set of one or more commuters are expected to travel on the second distance segment at the departure time for beginning the second distance segment in accordance with a weather condition or a traffic incident at the departure time for beginning the second distance segment.

12. The method of claim 11 further comprising accessing a database of traffic information to retrieve traffic information existing at the departure time for beginning the second distance segment pertaining to the first distance segment.

13. The method of claim 11, wherein the traffic information comprises traffic flow, traffic events, travel time, travel distances, or a combination thereof.

14. The method of claim 11, wherein the first distance segment and second distance segment comprise a predetermined distance, a predetermined road, a predetermined road segment, or a combination thereof.

15. The method of claim 14, wherein the predetermined distance comprises a predetermined road distance or a predetermined radial distance.

16. The method of claim 11, wherein the traffic information is based on a geographic reference system, at least one expected traffic condition, a routing engine, or a combination thereof.

17. The method of claim 11, further comprising identifying a departure location for beginning the first distance segment.

18. One or more computer-readable storage medium having computer-executable instructions for calculating the estimated time of travel completion for a set of distance segments, comprising:
    identifying a first distance segment;
    identifying a departure time for beginning the first distance segment;
    determining an estimated ending time for completing the first distance segment, wherein estimating the ending time for completing the first distance segment comprises accessing a database having traffic information pertaining to the departure time for beginning the first distance segment and pertaining to the first distance segment traffic;
    identifying a second distance segment, the second distance segment starting at the end of the first distance segment and having a departure time for beginning the second distance segment equal to the estimated ending time for completing the first distance segment;
    identifying a third distance segment, the third distance segment starting at the end of the first distance segment and having a departure time for beginning the third distance segment equal to the estimated ending time for completing the first distance segment; and
    determining an estimated ending time for completing the second distance segment and the third distance segment, wherein estimating the ending time for completing the second distance segment and the third distance segment comprises accessing a database having traffic information existing at the departure time for beginning the second distance segment and the third distance segment and pertaining to a rate of speed expected to be traveled by one or more commuters on the second distance segment and the third distance segment in accordance with a weather condition or a traffic incident at the departure time for beginning the second distance segment and the third distance segment.

19. The one or more computer-readable media of claim 18 further comprising identifying a departure location for beginning the distance segment.

20. The one or more computer-readable media of claim 18, wherein the estimated time of travel completion is calculated for all distance segments on a route.

* * * * *